May 17, 1932.   R. H. JOHNSON   1,858,709
NUT LOCK
Filed Oct. 2, 1929

Inventor
R. H. Johnson
By
Wilkinson & Giusta
Attorneys.

Patented May 17, 1932

1,858,709

UNITED STATES PATENT OFFICE

ROBERT H. JOHNSON, OF WASHINGTON, DISTRICT OF COLUMBIA

NUT LOCK

Application filed October 2, 1929. Serial No. 396,877.

The present invention relates to improvements in nut locks and has for an object to provide secure means for making fast the nut upon the bolt.

Another object of the invention is to provide a simple, compact and inexpensive construction in which very little modification is made either in the nut or in the bolt.

A further object of the invention lies in providing an improved nut lock in which the nut may be locked at any position and will be securely held in that position until manually released; the releasing operation being convenient and quick.

With the foregoing and other objects in view, the invention will be more fully described herinafter, and will be more particularly pointed out in the claim appended hereto.

In the drawings, wherein like symbols refer to like or corresponding parts throughout the several views.

Figure 1:
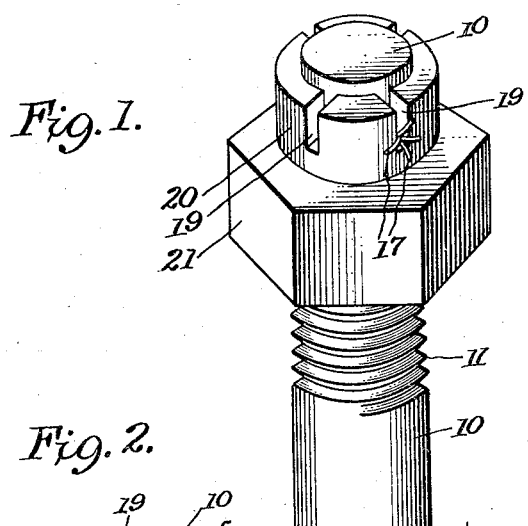
Figure 1 is a fragmentary perspective view of an improved nut lock constructed according to the present invention.

Referring more particularly to the drawings, 10 designates a bolt having a threaded end portion 11. This bolt may be of conventional construction except that a chamber 12 is made near the end thereof. This chamber traverses the bolts at substantially right angles to its axis. A shoulder 13 divides a larger diameter of the chamber from a smaller portion thereof indicated at 14. Within the chamber is slidably mounted a head or plunger 15 carrying one or more spring fingers 16 having the outwardly sprung ends indicated at 17. The plunger 15 is held within the chamber 12 by the shoulder 13 at one end and by a burred portion 18 at the other end. The spring fingers 16 are so grouped on the plunger 15 as to enable the same to project through the smaller opening 14 of the chamber whereby the fingers may project through any one of a number of slots 19 made in a collar 20 projecting from the nut 21.

In the drawings I show the threads stripped from the end portion of the bolt which contains the chamber 12 and the locking element 15, and this is the preferred arrangement, although the locking element might be contained in an extension piece on the bolt.

In the manufacture, both the bolt and the nut are conventional articles of manufacture, the bolt either during or after manufacture being bored with the chamber 12 and the opening 14.

Figure 2:
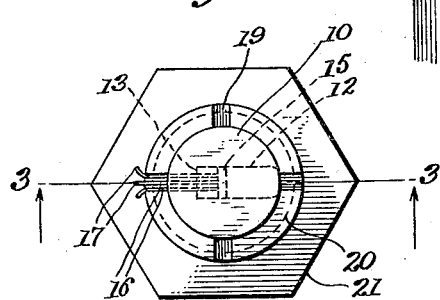
Figure 2 is a top plan view of the same with the parts in the locked position.
Figure 3:
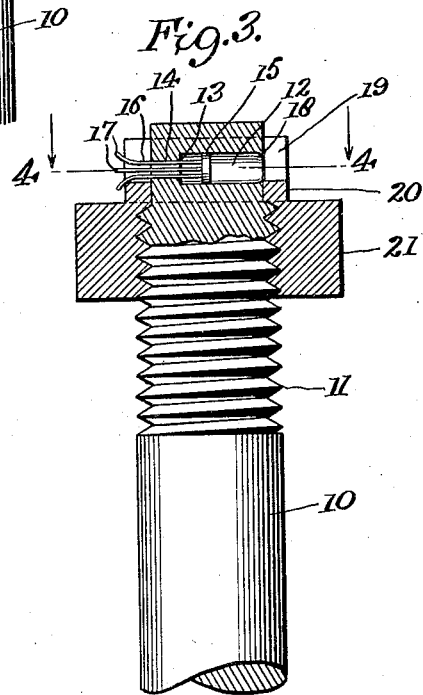
Figure 3 is a longitudinal section taken on the line 3—3 in Figure 2.

The nut 21 either during or subsequent to manufacture may be equipped with the slotted collar 20. Of course the locking element 15 is manufactured separately and afterwards assembled in the bolt, it being understood that the locking element is first inserted in the chamber 12 and the outer edge of the chamber is thereafter burred to prevent the loss of the locking element. If desired the free ends of the fingers 15 may be tied together when initially inserting the device or a cap might be put over these fingers to hold them grouped together in small compass to facilitate their passage through the narrow opening 14. In the use of the device, the parts will normally occupy the position shown in Figure 4 in which the plunger 15 and its fingers 16 are retracted within the chamber and the free ends 17 of such fingers are contained wholly within the confines of the bolt periphery. The nut 21 is now free to rotate on the threads 11 of the bolt 10 to such position as may be required. When the nut is screwed home, it is tightened until one of the slots 19 is presented to the opening 14. A diametrically opposed slot 19 will register with the open burred end of the chamber 12 whereby an instrument may be inserted through the aligned slot and chamber for the purpose of shoving the plunger 15 to the position shown in Figures 2 and 3. This movement of the plunger is accompanied by the projection of the fingers 16.

When the outer tip end of these fingers gain freedom beyond the side of the collar 20, due to their inherent elasticity they will spread out and constitute a yielding grip for holding the locking element in the locked position. The plurality of fingers act to reinforce and strengthen one another and to insure the proper grasping by at least one of the fingers which will hold the parts locked.

Figure 4:
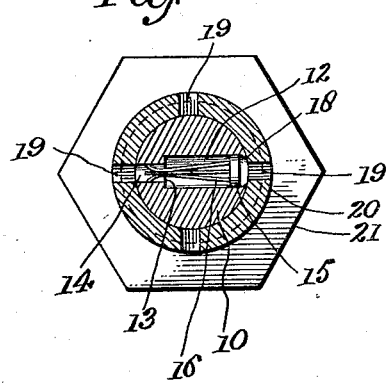
Figure 4 is a cross section taken on the line 4—4 in Figure 3 with the parts in the unlocked position.
Figure 5:
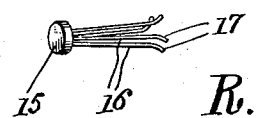
Figure 5 is a perspective view of the locking element employed.

To release the device, the free ends of fingers are squeezed together in the hand or in an appropriate implement, and such fingers are pushed inwardly until they escape from the slot 19 which they lately occupied and until they assume substantially the position shown in Figure 4. The fingers will tend to retain this inner unlocked position by reason of their elastic expansion against the side walls of the opening 14. The nut is now free to be rotated backwardly off on the bolt.

It is obvious that various changes and modifications may be made in the details of construction and design of the above specifically described embodiment of this invention without departing from the spirit thereof, such changes and modifications being restricted only by the scope of the following claim.

What is claimed is:

An improved nut lock comprising a slotted nut, a threaded bolt for receiving said nut and having a shouldered chamber extending laterally therethrough with a smaller opening beyond the shoulder, a plunger mounted to reciprocate in said chamber and confined therein, and a group of spring fingers carried by the central portion of said plunger and adapted to project out through said smaller opening, and to pass through the slot in the nut, said fingers having outwardly flared terminal portions for expanding against the outer portion of the slotted nut and to hold the device in the locked position.

ROBERT H. JOHNSON.